United States Patent [19]

Crean

[11] Patent Number: 4,791,768
[45] Date of Patent: Dec. 20, 1988

[54] COMPOSITE STRUCTURE FOR MOBILE CARRIAGES AND METHOD OF CONSTRUCTION THEREOF

[76] Inventor: Johnnie R. Crean, 29263 Country Hills Rd., San Juan Capistrano, Calif. 92675

[21] Appl. No.: 69,973

[22] Filed: Jul. 7, 1987

[51] Int. Cl.⁴ .............................................. E04B 1/74
[52] U.S. Cl. .................................... 52/309.11; 52/404
[58] Field of Search ................... 52/309.11, 404, 813, 52/309.9

[56] References Cited

U.S. PATENT DOCUMENTS

| | | | |
|---|---|---|---|
| 3,462,899 | 8/1969 | Sherman | 52/309.9 X |
| 3,736,715 | 6/1973 | Krumwiede | 52/309.11 |
| 3,785,913 | 1/1974 | Hallamore | 52/309.11 X |
| 4,068,434 | 1/1978 | Day et al. | 52/309.11 X |

OTHER PUBLICATIONS

Jul. 1987 Monitor, Travel Trailers & Fifth Wheels, a sales brochure by the Holiday Rambler Corp. of Wakarusa, Indiana Primary Examiner—Carl D. Friedman
Attorney, Agent, or Firm—F. Eugene Logan

[57] ABSTRACT

A composite structure is disclosed which is especially useful as a sidewall for trailers. The structure, however, because it is very strong can be used for end walls, roofs or floors and even prefabricated housing. The composite structure provides all the advantages of wood framing and aluminum framing and has good raking characteristics. A method of producing the structure is also disclosed which can be used in a production line assembly operation.

21 Claims, 1 Drawing Sheet

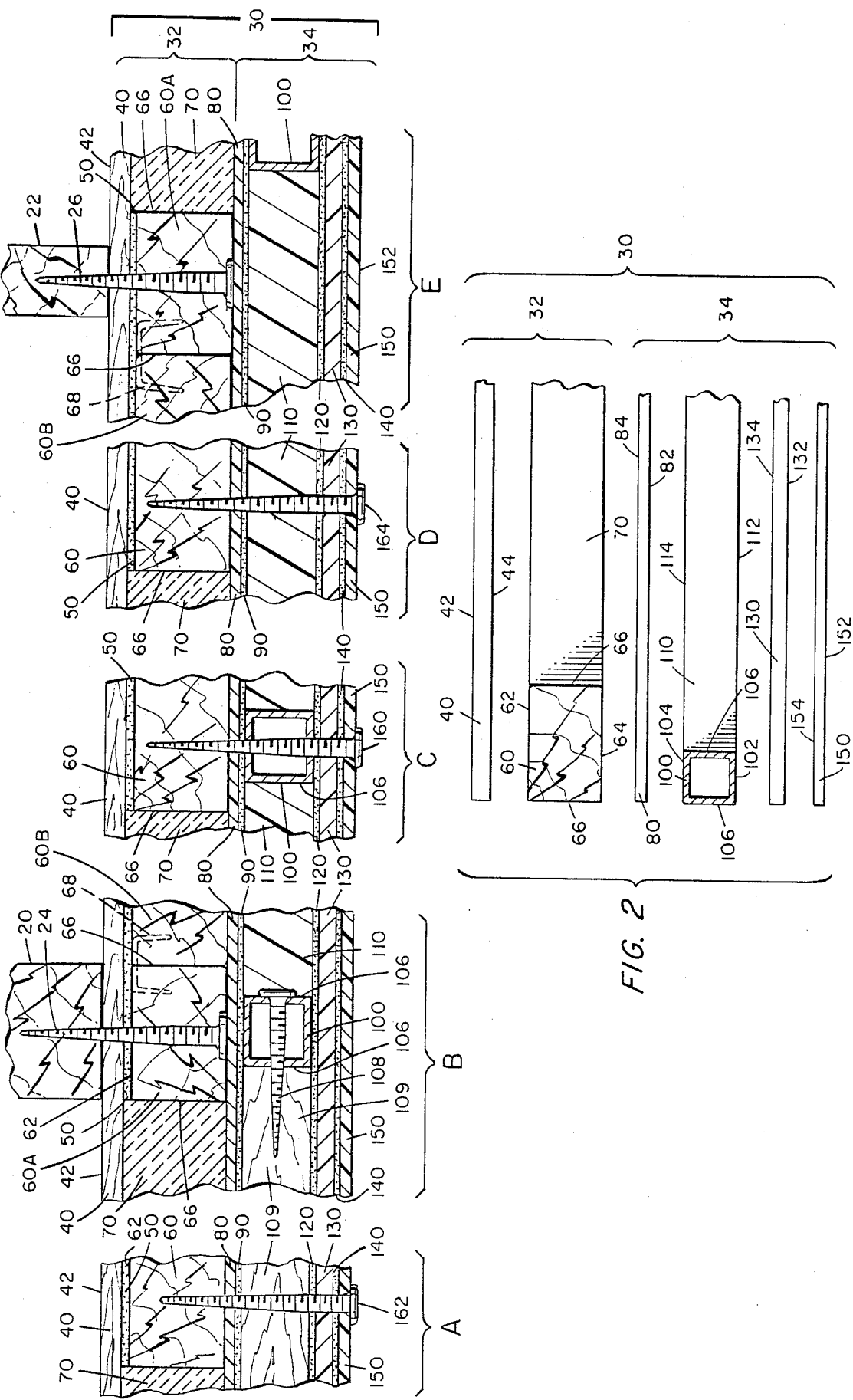

COMPOSITE STRUCTURE FOR MOBILE CARRIAGES AND METHOD OF CONSTRUCTION THEREOF

BACKGROUND OF THE INVENTION

The invention relates to structures suitable for mobile carriages such as trailers, motor coaches and the like. The structure of this invention is especially useful for sidewalls of mobile carriages, however, it can be used for end walls, roofs, floors. It can also be used for making panels for structures that are prefabricated including prefabricated houses. This invention is also for a method of producing the structure of this invention. The method is especially useful for mass production of the structure in a production line assembly operation.

SUMMARY OF THE INVENTION

This invention is for composite structures suitable for use in the construction of trailers, especially recreational or office trailers of the type suitable for frequent travel on roads. Travel trailers for which the composite structure of this invention is useful includes large and small trailers, fifth wheel trailers, office trailers, camping trailers and motorized coaches. The composite structure of this invention is most useful for sidewall construction, however, it can also be used for front and rear walls, roof and floor if desired.

Generally sidewalls for trailers are either a wood frame construction or a metal frame construction. Wood frame sidewall construction has the advantage of being stronger and less susceptible to loosening of metal fasteners therein than metal frame sidewalls. This is especially important where the trailer is being used on poorer surfaced roads or off-road use. Screws and other metal fasteners screwed or stapled or the like into wood tend to stay in the wood frames longer than screws or bolts or the like in metal frames. This means that cabinets and interior walls which are fastened or screwed to the wood framing of the sidewall tend to stay tight for a longer period of time than cabinets and interior walls which are fastened or screwed to the metal framing of a metal framed sidewall. In general, the flexibility of wood frame sidewalls as compared to metal frame sidewalls enables wood framed trailers to better withstand the twisting and bending that trailers are subjected to in their normal use.

The trailer industry has referred to the improved flexability of trailers with wood framing as having better "raking characteristics." The superior raking characteristic of wood framed trailers enables them to be used on unimproved roads and off-road usage. Thus trailers used by the sporting group for camping and the like are usually better served by wood framed trailers.

Wood framed sidewalls also allow all interior walls, cabinets and the like to be fastened or screwed through the wood framing into such interior walls and cabinets. By fastening such interior walls and cabinets through the wood framing itself, the metal fasteners are completely hidden from view and even more important to the consumer, there is no need for brackets, strip boards and the like to be used for mounting cabinets and interior walls to the sidewall. Whereas metal framed sidewalls usually require, if a strong mounting is desired, a strip board or metal bracket for securing cabinets and interior walls to the sidewalls. In metal framed sidewall structures screws are put through strip boards and brackets into the interior paneling of the sidewall and thence into the metal framing thereof. Screws are then put through brackets or strip boards into the cabinets and interior walls of the trailer. However, in wood framed siewall construction by fastening and screwing all cabinets, interior walls and the like directly to the wood framing, such cabinets and interior walls become, from a structural point of view, part of the framing of the trailer and add substantially to the structural strength of the trailer. However, in the above-described metal framed sidewall structure, such cabinets and interior walls do not stiffen the entire structure as effectively due primarily to the manner in which the cabinets and interior walls are mounted, i.e. by screws starting in strip boards, or brackets and then into the metal framing rather than by screws starting in the wood framing and terminating in the cabinets and interior walls.

Wood framed sidewalls also allow all electrical wiring to be run in the interior of the wall as in normal permanent house construction, whereas metal framed sidewalls generally require a box-like enclosure which houses the electrical wiring to be mounted on the decorative surface of the interior paneling. Although such conduit boxes are usually hidden from view as much as possible by locating them inside cabinets and the like, the presence of such box-like enclosures inside cabinets reduces the usefulness of the cabinet for storage purposes and as a consequence, the consumers frequently object to their presence and tend to regard such construction as inferior.

Wood frame trailers usually also have lower heat transfer through the wall since metal framing has a higher thermal conductivity than wood framing.

Because of the superior raking characteristics of wood framed sidewall construction for trailers, the ability to fasten cabinet and interior wall directly to the wood framing, and the ability to run all electrical wiring inside the wall and better thermal insulation properties provided by wood framed sidewall construction, such construction is usually also favored for more luxurious trailer construction.

Notwithstanding the above described advantages of wood framing for trailers, metal framing, usually of aluminum, is still used for constructing walls for trailers because it is lightweight, has a relatively high strength to weight ratio, and individual frame members can be joined together by welding. The strength of a welded joint is well known and provides an attractive advantage of metal framed sidewalls that wood framed sidewalls can not offer. However, since cost would be very high to run electrical wiring in the interior of a metal framed wall, it is usually regarded as not a commercially viable design. Accordingly, the spaces between the metal frame members are frequently filled with a solid board-like insulation such as expanded polystyrenes. Such sidewall structures are usually finished on the outside with layers of various sheeting material with the outermost layer being an aluminum outer skin or fiber glass sheeting. Aluminum framed sidewall construction in a trailer because of its relatively lower weight requires less horsepower to pull and consequently provides the consumer the advantage of saving on fuel or gasoline cost for pulling the trailer.

Aluminum framed sidewalls which have solid insulating board between the aluminum frame members and a bonded exterior fiber glass paneling have another important characteristic, namely such structures have an impressive solid sound when consumers pound on it with their fist. This sound test administered by a shopper is like the impression formed by consumers shopping for cars who slam the car door so they can hear what it sounds like. In other words, does it have a solid sound which the consumer immediately associates with strong solid construction or does it have a hollow sound which the consumer immediately associates with a void-like, and hence, low strength construction. Shoppers are known to pound their fists on the sidewall of trailers to determine if the wall is solid and hence deemed to be strong, or hollow and hence deemed to be weak. A wall constructed from aluminum framing with solid insulating board filling the spaces between individual frame members and fiber glass paneling bonded to the outside are in fact very strong and rigid and when pounded with the fist, produce a sound immediately associated with a solid wall. In wood framed sidewall construction in which spun fiberglass or the like is used because it can be conveniently stuffed around the electrical wiring, pounding on the sidewall produces a more hollow like sound which frequently does not impress the consumer.

Accordingly what is needed is a sidewall structure that has all of the more desirable characteristics of both a wood framed sidewall and a metal framed sidewall and which has none of the less desirable characteristics of such sidewalls.

This invention provides a composite structure which has all the advantages of a wood frame sidewall while also having the desirable characteristics of a metal framed sidewall including the high strength associated with sidewalls having a metal frame. This invention further provides for a method of producing on a production basis the composite wall structures of this invention so that the cost of trailers or other mobile carriages can be competitive in the marketplace with products having conventional wood framed sidewalls or conventional aluminum framed sidewalls.

Accordingly this invention provides for a structure having the raking characteristics of a wood frame structure while allowing for the fastening of members such as cabinets, interior walls and the like through the wood frame and into such members without the need for strip boards, brackets or the like. This invention also allows the running of electrical wiring in the interior of the wall and provides the lower heat transfer characteristic of a wood frame wall while providing for a highly rigid structure characteristic of a metal frame wall. The outermost portion of the structure of this invention is also solid and produces a solid sound when pounded upon with the fist. This invention further provides for a method of producing the structure of this invention.

Accordingly there is provided a composite structure for mobile carriages comprising an interior paneling having a finished planar first surface, an opposite thereto planar second surface and a thickness therebetween; wood framing having a planar first surface, an opposite thereto planar second surface and a thickness and a traverse surface therebetween, the first surface of the wood framing being bonded to a small portion of the second surface of the interior paneling thereby leaving a large remaining surface area of the second surface of the interior paneling spaced away from the wood framing; and an insulating first substance abutted against the traverse surface of the wood framing and the second surface of the interior paneling. The composite structure further comprises an exterior paneling having a finished planar first surface, an opposite thereto planar second surface and a thickness therebetween; a pliable first substrate having a pliant planar first surface, an opposite thereto pliant planar second surface and a thickness therebetween, the first surface of the first substrate being bonded to the second surface of the exterior paneling; metal framing having a planar first surface, an opposite thereto planar second surface and a thickness and traverse surface therebetween, the first surface of the metal framing being bonded to a small portion of the second surface of the first substrate thereby leaving a large remaining surface area of the second surface of the first substrate spaced away from the metal framing; a pliable second substrate having a pliant planar first surface, an opposite thereto pliant planar second surface and a thickness therebetween, the second surface of the metal framing being bonded to a small portion of the first surface of the second substrate thereby leaving a large remaining surface area of the first surface of the second substrate spaced away from the metal framing, the large remaining surface area of the first surface of the second substrate opposing the large remaining surface area of the second surface of the first substrate thereby forming a first space bounded by the second surface of the first substrate, the first surface of the second substrate and the metal framing; and an insulating second substance enclosed in and approximately filling the first space. In this composition structure the second surface of the wood framing is fastened to a small portion of the second surface of the second substrate thereby leaving a large remaining surface area of the second surface of the second substrate spaced away from the wood framing, and also thereby forming a second space bounded by the large remaining surface area of the second surface of the second substrate, the large remaining surface area of the second surface of the interior paneling and the wood framing, and further wherein the insulating first substance is enclosed in and approximately fills the second space.

In another embodiment the first substance is a spun fiberglass insulation.

In yet another embodiment the metal framing is aluminum framing, the interior paneling is interior wood paneling and the exterior paneling is selected from the group consisting of exterior plastic sheeting and exterior metal sheeting.

In one embodiment of this invention the second substance is a rigid insulating panel having a planar first surface, and opposite thereto planar second surface and a thickness therebetween which is approximately equal to the thickness of the metal framing. In a further embodiment of this invention the first surface of the second substance is bonded to the large remaining surface area of the second surface of the first substrate, and the second surface of the second substance is bonded to the large remaining surface area of the first surface of the second substrate.

In one embodiment the insulating second substance is an expanded plastic material, preferably an expanded rigid plastic material and especially preferably an expanded rigid plastic material such as polystyrene and the like.

In one embodiment the bond of the interior paneling to the wood framing is an adhesive bond and a stapled bond.

In one embodiment of this invention the bond of the first substrate to the exterior paneling is an adhesive bond; and the bond of the metal framing to the first substrate and to the second substrate is an adhesive bond. In a further embodiment the adhesive bonds are vacuum adhesive bonds, i.e. such bonds are effected by a vacuum bonding operation.

Another embodiment of this invention comprising a bond between the insulating second substance and the traverse surface of said metal framing.

Another embodiment of this invention comprising a first subassembly comprising the interior paneling, the wood framing and the first substance; a second subassembly comprising the exterior paneling, the first substrate, the metal framing, the second substance, and the second substrate; and a fastening of the second surface of the wood framing to the second surface of the second substrate which comprises a plurality of metal fasteners extending from the metal framing through the second substrate and into the wood framing.

In one embodiment of this invention the metal fasteners are selected from the group consisting of screws, staples, nails and the like, and mixtures thereof.

In a preferred embodiment of this invention the metal framing is aluminum framing, the interior paneling is wood paneling, the exterior paneling is selected from the group consisting of plastic sheeting and metal sheeting, the second substance is an expanded rigid polystyrene plastic, and the first substance is spun fiberglass.

This invention also provides for a method of producing a composite structure useful for a wall, floor or roof of a manufactured structure including mobile carriages. The method is particularly useful for the continuous line production of composite structures and especially useful for producing sidewalls for trailers.

Accordingly there is provided by this invention a method of forming composite wall structures for mobile carriages comprising:

(a) fastening interior paneling on wood framing, the interior paneling having a finished planar first surface, an opposite thereto planar second surface and a thickness therebetween, the wood framing having a planar first surface, an opposite thereto planar second surface and a thickness and a traverse surface therebetween, the fastening being by adhesively bonding and stapling the interior paneling to the wood framing so that a small portion of the second surface of the interior paneling is joined to the first surface of the wood framing, thereby leaving a large remaining surface area of the second surface of the interior paneling spaced away from the wood framing;

(b) abutting an insulating first substance against the traverse surface of the wood framing and the second surface of the interior paneling, thereby forming a first subassembly comprising the interior paneling, the wood framing and the insulating first substance;

(c) fastening an exterior paneling to a pliable first substrate, the exterior paneling having a finished planar first surface, an opposite thereto planar second surface and a thickness therebetween, the first substrate having a pliant planar first surface, an opposite thereto pliant planar second surface and a thickness therebetween, the fastening being by adhesively bonding the first surface of the first substrate to the second surface of the exterior paneling;

(d) fastening metal framing to the first substrate, the metal framing having a planar first surface, an opposite thereto planar second surface and a thickness and a traverse surface therebetween, the fastening being by adhesively bonding the first surface of the metal framing to a small portion of the second surface of the first substrate thereby leaving a large remaining surface area of the second surface of the first substrate spaced away from the metal framing;

(e) abutting an insulating second substance to the large remaining surface area of the second surface of the first substrate, the second substance having a thickness which is approximately equal to the thickness of the metal framing;

(f) fastening a pliable second substrate to the metal framing, the pliable second substance having a pliant planar first surface, an opposite thereto pliant planar second surface and a thickness therebetween, the fastening being by adhesively bonding the second surface of the metal framing to a small portion of the first surface of the second substrate thereby leaving a large remaining surface area of the first surface of the second substrate spaced away from the metal framing, the large remaining surface area of the first surface of the second substrate opposing the large remaining surface area of the second surface of the first substrate, and thereby enclosing the second substance in a first space bounded by the second surface of said first substrate, the first surface of the second substrate and the metal framing, and thereby forming a second subassembly comprising the exterior paneling, the first substrate, the metal framing, the second substance and the second substrate; and (g) fastening the second subassembly to the first assembly by passing a plurality of metal fasteners through the metal framing into the wood framing with the second substrate sandwiched between the wood framing and the metal framing so that the second surface of the wood framing abuts a small portion of the second surface of the second substrate thereby leaving a large remaining surface area of the second surface of the second substrate spaced away from the wood framing, and thereby enclosing the first substance in a second space bounded by the large remaining surface area of the second surface of the second substrate, the large remaining surface area of the second surface of the interior paneling and the wood framing.

In one embodiment of this invention the method further comprises making the first subassembly on a jig table so that a plurality of substantially identical first subassemblies can be massed produced.

In another embodiment of this invention the method further comprises installing electrical wiring in the first assembly before fastening the second subassembly to the first subassembly.

In a further embodiment the method comprises fastening the first subassembly to a floor for a mobile carriage by metal fasteners going through the wood framing into the floor, and fastening the first subassembly to interior walls and interior cabinets by metal fasteners first going through the wood framing and then going into the interior walls and the interior cabinets before fastening the second subassembly to the first subassembly.

In yet another embodiment of this invention wherein the insulating second substance is a rigid substance having a planar first surface, an opposite thereto planar second surface and a thickness between the first and second surfaces thereof, the method further comprises adhesively bonding the first surface of the second substance to the large remaining surface area of the second surface of the first substrate; and adhesively bonding the second surface of the second substance to the large remaining surface area of the first surface of the second substrate so that the second substance fills the first space. In a further embodiment the adhesively bonding of the exterior paneling to the first substrate, the adhesively bonding of the first substrate to the metal framing and the second substance, and the adhesively bonding of the metal framing and the second substance to the second substrate is completed simultaneously in a single vacuum bonding operation. In one embodiment of this invention for trailer sidewall construction, the second subassembly for the entire length of a sidewall is adhesively bonded in a single vacuum bonding operation conducted on a horizontal vacuum table.

In further embodiments of this invention the fastening of the second subassembly to the first subassembly comprises screwing screws through the exterior paneling into the first substrate, thence into the metal framing, thence into the second substrate and thence into the wood framing. In a preferred embodiment the end of the screws terminate in the wood framing and the method further comprises tightening the screws so that the screw heads compress the first substrate between the exterior paneling and the metal framing and compress the second substrate between the wood framing and the metal framing.

In yet another embodiment the fastening of the second subassembly to the first subassembly comprises screwing screws through the exterior paneling into the first substrate, thence into the expanded insulating second substance, thence into the second substrate and thence into the wood framing. In a preferred embodiment the end of the screws terminate in the wood framing and the method further comprises tightening the screws so that the screw heads compress the first substrate between the exterior paneling and the insulating second substance and compress the second substrate between the insulating second substance and the wood framing.

BRIEF DESCRIPTION OF THE DRAWINGS

FIG. 1 is plan view as seen through a horizontal cut through a representative sidewall of the composite structure of this invention.

FIG. 2 is a plan view in cross section and in exploded representation showing the principal layers of structural elements of FIG. 1.

DESCRIPTION OF THE PREFERRED EMBODIMENT

FIG. 1 represents a horizontal cut through various sidewall sections of this invention useful as trailer sidewalls. To provide greater detail of the areas of interest, FIG. 1 is broken at several locations along the vertical. Between the various break points the common elements of the laminated structure extend; however, it is to be understood that sections A, B, C, D and E can be arranged in anyorder and not just in the order as shown, i.e. A-B-C-D-E. For example the sections of a trailer sidewall might be arranged as: A-D-C-D-C-D-C-D-C-D-B-D-C-D-C-D-C-D-D-B-D-C-D-B-D-A-D-C-D-C-C-A, or any other arrangement. Furthermore the arrangement of sections A, B, C, D and E at one elevation of a sidewall need not be the same at all elevations, and frequently in the case of a sidewall for a trailer the arrangements of sections vary to accommodate windows, doors and other various alterations to a wall which run from floor to roof.

Referring to FIG. 1, interior walls, such as wall 20 and cabinets, such as cabinet member 22 are fastened by metal fasteners, such as screws 24 and 26, to the composite structure of this invention, which is represented as sidewall composite structure 30. Composite structure 30 comprises wood frame subassembly 32 and metal frame subassembly 34 which are shown in explosive assembly of FIG. 2.

Wood frame subassembly 32 comprises interior paneling 40, glue 50, and a layer comprising wood framing 60 and insulating first substance 70. As used herein element number 60 shall mean vertical wood framing member 60A or horizontal wood framing member 60B or both. Metal frame subassembly 34 comprises second substrate 80, glue 90, a layer comprising metal framing 100 and insulating second substance 110, glue 120, first substrate 130, glue 140, and exterior paneling 150. Subassembly 34 is fastened to subassembly 32 by metal fasteners, e.g. screws 160.

For illustration purposes the procedure for producing the composite structure of this invention will be described in conjunction with its usage in the construction of mobile trailer coaches such as those commonly referred to as travel trailers and fifth wheels. In this illustration the composite structure of this invention will be used in the two verticle sidewalls of the coach. It is to be understood, however, that the composite structure of this invention can be used if desired for front and rear walls and the roofs and floors, i.e. the usefulness of the composite structure of this invention is not limited to merely sidewalls of mobile structures or even to mobile carriages.

Wooden flooring is first bolted to the metal frame of the trailer after the wheels are on the trailer. This allows the trailer to be rolled on its wheels along the assembly line. All interior walls and cabinets are then set in the coach by screwing such interior walls and cabinets to the floor. All plumbing and fixtures are then installed in the coach.

Next the sidewall wood frame subassemblies of this invention are manufactured. Usually the sidewalls for the road side and curb side are different so that two different jigs will be required. Different jigs will also be required for each particular model of coach to be manufactured as is standard practice in the industry for wood framed coaches.

A sidewall is first framed on a jig table by arranging individual wood framing members on the jig table in a predetermined pattern and fastening such members together with metal fasteners, e.g. staples, nails, screws or combinations thereof. Glue may also be used, if desired, to join wood frame members together. In one embodiment of the sidewall composite structure of this invention the vertical wood frame members are spaced on about 24-inch centers. The wood framing is preferably formed for an entire sidewall.

Referring to FIGS. 1 and 2, individual vertical wood frame members 60A and horizontal wood frame members 60B are arranged on a jig table with second surface 64 laying on top of the jig table. Individual wood frame members are fastened together with metal fasteners, for example staples 68. Next glue is applied to first surface 62 of all wood frame members and interior wood paneling 40 is lowered down on to surface 62 so that second surface 44 of paneling 40 is in contact with the glue. After the glue is set, glue 50 firmly bonds surface 44 of paneling 40 to surface 62 of wood framing members 60. First surface 42 of paneling 40 is an attractive finished surface and forms the visible inner wall of the coach. While paneling 40 and wood framing 60 are still on the jig table, windows, doorways, trunk openings, and other required cutouts in paneling 40 are completed.

The perimeter of paneling 40 is cut to its final shape. When the outer and inner perimeters of paneling 40 are completed, the subassembly is ready for mounting on the coach.

At this point wood frame subassembly 32, which consists of interior paneling 40 bonded to wood framing 60, is preferably one large single unitary composite structure. This structure is then picked up and placed in its proper position on the coach floor. Metal fasteners, for example wood screws 24, are inserted or screwed through wood framing 60 into interior walls 20. Similarly other metal fasteners, for example wood screws 26, are inserted or screwed through wood framing 60 into cabinet members 22. Where it is possible to fasten cabinets by screws through wood framing 60, such method is used; however, it is not necessary that all metal fasteners for attaching cabinet members 22 go through wood frame members 60. In locations where there is no wood frame member present, shorter metal fasteners (not shown) can be inserted or screwed directly through paneling 40 into cabinet members 22. If desired glue can be added between interior walls 20 and cabinet members 22 before fasteners 24 and 26 are inserted or completely tightened.

Inner front and rear wall subassemblies, similar to wood frame subassembly 32 and preferably made on a jig table, are then positioned on the coach floor and fastened to both the floor and sidewall wood framing subassembly 32 by metal fasteners, for example wood screws. Preferably the front and rear walls cover the ends of the wood frame subassemblies thereby lengthening the coach. When all inner portions of both sidewalls and front and rear walls of the coach are in place and firmly fastened to each other, and to the coach floor and interior walls and cabinets, the coach is then ready for installation of the inner roof subassembly.

Preferably the inner roof subassembly is made on a jig table in a manner similar to the method of producing the sidewall wood frame subassembly 32 previously described, i.e. it consists of an interior paneling and a wood frame. For coaches having roofs with more than one elevation, several such subassemblies are preferably made and installed in a conventional manner. The roof subassembly or subassemblies are then positioned over sidewall subassemblies 32, front and rear wall subassemblies, interior walls and cabinets, and fastened thereto with metal fasteners, e.g. wood screws in a conventional manner. After the roof subassembly is installed the interior of the coach is structurally complete and the coach is ready for installation of electrical conduits, components and fixtures.

The electrical wiring for the entire coach is now installed in wood framing 60 and the space therebetween and outside of second surface 44 of paneling 40. Therefore in this invention, as in conventional all-wood-framed coaches, all electrical conduits are run inside the wall and no tracks or conduits for electrical circuits are required inside the coach interior or inside cabinets and the like.

After all electrical conduits and components required for the coach are installed, first insulating substance 70 is installed in the spaces bounded in part by traverse surfaces 66 of wood frame members 60 and second surface 44 of interior paneling 40. First subassembly 32 of the sidewall composite structure is now complete and coach is ready for installation of sidewall second subassembly 34.

The procedure for construction of second subassembly 34 of the composite structure of this invention will now be described. Metal frame members 100 are arranged in a predetermined manner on a jig table for the particular model coach under construction. Usually a separate jig table or jig is required for road side and curb side sidewalls. Metal frame members 100 are then welded together on the jig table. In one embodiment the vertical metal frame members are spaced on about 24-inch centers. Other spacing can, however, be used if desired. Any plywood sections 109 required in the metal framing layer are preferably bonded to substrates on each side as will be explained more fully below. In an alternative embodiment of this invention, plywood sections 109 are fastened to traverse surface 106 of metal framing 100 by metal fasteners, e.g. wood screws 108, by inserting or screwing fasteners 108 through traverse surfaces 106 of metal framing 100 and thence into plywood sections 109. In yet another embodiment of this invention plywood sections 109 are also fastened by metal fasteners 162 to wood framing 60. However, in most sidewall construction, it has been found that bonding of plywood sections to adjacent substrates is sufficient and that fasteners 108 between metal framing 100 and plywood sections 109 are not required. It should be noted that the plywood and metal framing lie in the same plane. The thickness of plywood sections 109 is equal to the thickness of metal framing 100 which is determined by the width of traverse side 106 thereof.

After completing the welding of metal frame members 100 together and the fastening of any plywood members 109 required in the metal framing layer, rigid insulating second substance 110 is cut into panels and snug fitted in each space bound by traverse surfaces 106 of metal frame members 100. After cutting and fitting in place, all sections of insulating substance 110, the insulating sections are removed from metal frame 100 and set aside for the moment.

A sheet of pliable second substrate 80 is spread out on a lay-up table with surface 84 next to the table top and surface 82 facing upwards. Welded metal framing 100 is picked up and positioned directly over second surface 82 of first substrate 80 so that metal framing 100 can be quickly lowered on to substrate 80. A layer of glue 90 is sprayed on surface 82 of second substrate 80 and metal framing 100 quickly lowered down on to substrate 80 which is resting on the lay-up table. Precut rigid insulating second substance panels 110 are then quickly refitted into the spaces between metal frame members 100 and pressed downward on to glue layer 90.

A second layer of glue 120, is then quickly sprayed over surface 102 of metal framing 100 and surface 112 of insulating substance 110. A layer of first substrate 130 is then placed on glue 120 so that second surface 134 of substrate 130 contacts glue 120.

Then a third layer of glue 140, is sprayed on surface 132 of substrate 130 and a layer of exterior paneling 150 is placed on glue 140. Exterior paneling 150 has finished decorative exterior surface 152 and opposing surface 154 which is positioned on glue 140.

Second substrate 80, glue 90, metal framing 100 and rigid insulating second substance 110, glue 120, first substrate 130, glue 140 and exterior paneling 150 form second subassembly 34. Subassembly 34 is then slid as a unit from the lay-up table to a vacuum table.

Vacuum tables are conventional devices used for effecting the bonding of layers of substances together with adhesive interfaces. A canvas cover is first lowered over subassembly 34 which is now resting on the vacuum table. A partial vacuum is pulled between the canvas cover and the vacuum table on subassembly 34 to remove air from the several glue layers and to force the several layers of structure components downward under compression against the vacuum table thereby producing an effective and strong adhesive bond between the several layered components of metal frame subassembly 34. After a predetermined length of time, subassembly 34 is removed from the vacuum table device and is ready for mounting on the coach.

Subassemblies 34 for both the road side and curb side are then positioned on the floor of the coach next to their respective wood frame subassemblies 32. Metal fasteners 160, e.g. wood screws, are inserted or screwed through first surface 152 of exterior paneling 150, thence into first substrate 130, thence into metal framing 100, thence into second substrate 80 and thence into wood framing 60 thereby securing second subassembly 34 to first subassembly 32. In some locations fasteners 164 and 162 pass through insulating second substance 110 or plywood sections 109, respectively, rather than through metal framing 100. However, fasteners 160, 162 and 164 always terminate in wood framing 60 regardless of whether they pass through framing 100, plywood sections 109 or insulating substance 110. Metal fasteners, e.g. wood screws, can also be inserted or screwed through the wood framing of the roof subassembly, thence into the roof interior paneling and thence into metal frame 100 and plywood sections 109. Preferably second subassembly 34 covers the ends of the front and rear wood subassemblies. The outer edges of the layers of first and second substrate and exterior paneling are then trimmed to their final perimeter. All doors, windows, trunk covers or baggage compartment doors and such other cut-outs as may be present in the sidewall are also trimmed to their final perimeters.

The coach is then finished structurally by adhesively bonding and stapling a third substrate, e.g. a plywood type sheet material to the front, rear and roof subassembly walls. An exterior paneling is then adhesively bonded to the third substrate on the front and rear walls and the roof. Preferably the exposed surface of the front and rear exterior paneling matches the exterior paneling of the sidewalls. Preferably the exposed surface of the exterior paneling of the roof is a non-slip or roughened finish to improve traction should there be a need to walk on the roof. The construction of the front and rear walls and roof in this example are conventional. Only the sidewall construction employs the composite structure of this invention. However, as mentioned before, if desired, the composite structure of this invention can be used for front and rear walls, and the roof and floor of the trailer.

Corner moldings for covering screw heads are then added in a conventional manner to finish the exterior trim of the coach. The trim for doors, windows and trunks is then added in a conventional manner as are the carpeting and finishing trims and fixtures to the coach interior.

A preferred configuration of first subassembly 32 is a follows:

| | |
|---|---|
| Paneling, 40 | 3.6 millimeter interior plywood based paneling with decorative vinyl or wood finished surface 42 |
| Wood framing, 60 | 1.125 inch × 1.5 inch finish grade wood studding |
| Insulating first substance, 70 | Spun fiberglass |

A preferred embodiment of second subassembly 34 is as follows:

| | |
|---|---|
| Second substrate, 80 | Kraft paper, laminated to polyethylene |
| Metal framing, 100 | Aluminum tubing, 0.75 inch × 0.75 inch except for tubing adjacent to floor which is 1.5 inch × 0.75 inch, both tubings having a wall thickness of about 0.0625 inch |
| Insulating second substance, 110 | Rigid expanded styrofoam board, 0.75 inch thickness |
| First substrate, 130 | Foam laminated between paper, 0.125 inch overall thickness |
| Exterior paneling, 150 | Fiberglass exterior sheathing, 0.045 inch overall thickness with decorative surface 152 |

Sources of materials used in a preferred embodiment of the composite structure of this invention as shown in FIG. 1 are as follows:

Paneling 40: 3.6 millimeter Executive paper overlay wall paneling with a Class C fire rating under ASTME-84, with a flame spread of 200 or less.

Insulating first substance 70: Fiber Glass Insulation for manufactured housing by Manville also referred to as fibrous glass insulation.

Second substrate 80: Kraft paper laminated to polyethylene such as #45 Barricade paper of Simplex Products Division of Anthony Industries, Inc.

Adhesive or glues 90, 120 and 140: Brand MorAd ® 336 or 366 urethane prepolymer solution of Morton Thiokol, Inc., used as a laminating adhesive.

Insulation second substance 110: Brand INSULFOAM EPS styrofoam board by Western Insulfoam.

First substrate 130: Fome-Cor Board ® brand foam laminated between paper by Monsanto.

Fiberglass exterior paneling 150: Brand RV-60 paneling by Sohio Chemical Company.

Alternative materials which can be used are as follows:

Insulating first substance 70: Mineral fiber, polyurethane foam, cellulostic fiber, wood fiber, paper fiber, and the like.

Second substrate 80: Thin plastic sheeting or RV undersiding such as brand TYPAR RV, 0.017 inches; fiber board or Bud board, 0.10 inches; Amocor Vapor/Insulation Material brand substrate; #55 Barricade brand substrate by Simplex Products Division; Kraft paper laminated to polyethylene; KPK vapor barrier brand two-ply Kraft paper; Simplex PS-70, PS-70II and PS-83 Barricade Roll brand Kraft paper laminated to polyethelene reinforced with scrim; Timco ML-2 Vapor Barrier brand foam laminated between paper; Polymar RV Undersiding brand plastic in the following thicknesses: 0.015, 0.020, 0.030 and 0.040 inches; and sheet metal including aluminum sheeting. These materials can also be used for first substrate 130 if desired. Other materials which can be used as first and second substrates are Luaun board, Masonite board, Wafer board, Particle board, roofing papers and Strand board.

Insulating second substance 110: Extruded or molded expanded polystyrene, Beadboard, phenolic foams, polyurethanes, honeycomb craft papers or plastics, and egg carton plastics.

The overall combined thickness of the above-described embodiment of the sidewall composite structure of this invention is about 2.3 inches. Other thickness can, of course, be used if desired.

The glue used for bonding interior paneling 40 to wood framing 60 is conventional white wood glue. The glue used to bond the several layers of components together in second subassembly 34 during the vacuum bonding operation is a sprayable urethane prepolymer solution suitable for use as a laminating adhesive.

In one embodiment the screws which are used for screwing the wood frame subassembly to interior walls, cabinet members, and floor and for screwing the metal frame subassembly to the wood frame subassembly and floor are conventional 2.5 inch wood screws.

With regard to interior paneling 40, the paneling of the mobile carriage preferably meets the safety standards as set forth in Section 3-1.1 of Chapter 3, Fire and Lifesafety Provisions, of the National Fire Protection Association's text on Standard For Recreational Vehicles.

The vacuum bonding operation is preferably conducted on a metal table which can be heated, if desired, to an elevated temperature, for example to 140 degrees F.

In one embodiment the vacuum table is heated to about 80 degrees F and the components are stored prior to assembly at 80 degrees F. In this embodiment the entire vacuum bonding operation is conducted at 80 degrees F for a predetermined length of time before metal frame subassembly 34 is fastened to wood frame subassembly 32. The advantage of heating the vacuum table is that it will shorten the curing or set time required on the vacuum table thereby allowing this step in the assembly operation to be speeded up and production through put increased. However, increasing the vacuum table temperature to reduce set time of the adhesive can result in internal stress between the laminated components of second subassembly 34 when the completed coach is placed in ambient environment which is at a substantially lower temperature than the vacuum bonding temperature. Thus the curing temperature should be such that the component layers of second subassembly 34 will not separate over the life of the coach in the particular environment in which the coach is to be used.

In one embodiment of this invention, the glue which is sprayed on the various components in the production of the metal frame subassembly 34 is both moisture and heat sensitive. A laminating adhesive or glue such as an urethane prepolymer solution is both moisture and heat sensitive in that as the humidity or temperature of the assembly room increases, the working time and the time to cure or set is reduced. Accordingly, care must be exercised from the time that first glue layer 90 is sprayed on substrate 80 until the vacuum bonding operation is completed to insure that air is removed before the adhesive is set thereby preventing entrapment pockets of air between the several layers of components of subassembly 34.

As mentioned earlier laminating adhesives 90, 120 and 140 are preferably MorAd 336 or 366 brand adhesives. Both the working time and cure time of these adhesives are sensitive to both moisture and temperature and require close control to insure that the various layers are properly registered relative to each other and that air bubbles are removed before the working time of the adhesive has lapsed. It should be understood that if the working time lapses before the various layers are properly registered or the air bubbles are removed, it will not be possible to effect the proper alignment and adhesive bonding and the subassembly will not meet specifications. Such out of specification subassemblies cannot be cost effectively salvaged and as a consequence must be discarded. Accordingly, in a production line assembly operation, it is important to complete each assembly step quickly so that the vacuum bonding operation can be effected before the working time lapses.

Published technical product data for MorAd 336 and 366 industrial adhesives specify the working time and the cure time as a function of temperature and relative humidity. Accordingly, the technical product specifications and data for MorAd 336 and 366 urethane laminating adhesives is hereby incorporated herein by reference.

It is to be understood that the purpose of metal fasteners 160 is to rigidly and securely fasten metal frame subassembly 34 to wood frame subassembly 32. Accordingly, fasteners 160 need not go through exterior paneling 150 or first substrate 130 but must at least securely fasten metal framing 100 to, and preferably terminate in, wood framing 60. In one embodiment of this invention fasteners 160 do go through exterior paneling 150 as shown in FIG. 1 and terminate in wood framing 60. As mentioned earlier, however, fasteners 162 and 164 are also used in secure metal frame subassembly 34 to wood frame subassembly 32 by passing such fasteners through plywood sections 109 and insulating second substance 110, respectively, rather than metal framing 100. Nonetheless, some fasteners 160 are always used to secure metal framing 100 to wood framing 60.

In one embodiment the composite structure of this invention uses wood framing and metal framing having a smaller thickness than normally used in trailer construction. By using both wood framing and metal framing with a smaller thickness, the overall wall thickness, i.e. the thickness between the finished interior paneling surface 42 and the exterior paneling surface 152 is not much larger than the thickness of a conventional wood frame sidewall normally used in trailer construction. The uniting of a wood frame subassembly and an aluminum frame subassembly according to the principals of this invention produces a composite structure of improved strength and stiffness which has not been possible with many earlier sidewall structures having just a wood frame or an aluminum frame. Because of the improved properties of the composite structure of this invention and the method of forming such structures provided by this invention, trailers with improved sidewall strength can now be produced at a price competitive with conventional sidewall construction. The improved sidewall strength of trailers or motor coaches using the composite structure of this invention provides greater safety for consumers.

The drawings are not drawn to scale; for example the various glue layers are represented in drawings as having substantial thickness merely for purposes of clarity of illustration when, in fact, there is very little thickness to the layers of glue. Similarly, if Kraft paper is used for second substrate 80, the thickness of that layer will also be relatively very small. Also interior wall 20 may be considerably thicker and contain interior paneling which is not shown on FIG. 1. Furthermore sections A, B, C, D and E in FIG. 1 need not be exactly as shown. For example in section B interior wall 20 need not be positioned only a locations where metal framing 100 is behind wood framing 60. Similarly interior cabinets can also be mounted at locations in which metal framing 100 is behind wood framing 60 and not only at locations in which rigid insulating material 110 is behind the wood framing. These and other variations from FIG. 1 will be ready apparent to one skilled in the art.

Still further fastener 160 need not go through exterior paneling 140 and first substrate 130, but can merely go through metal framing 100, second substrate 80 and into wood framing 60. To do this would of course, in the method of assembly of this invention, require coring of paneling 140 and substrate 130 so that fastener 160 would originate in framing 100. Such cored holes in paneling 140 would then be filled with a suitable substance.

Therefore it is to be understood that the present disclosure and embodiment of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A composite structure for mobile carriages comprising:
   an interior paneling having a finished planar first surface, an opposite thereto planar second surface and a thickness therebetween;
   wood framing having a planar first surface, an opposite thereto planar second surface and a thickness and a traverse surface therebetween, said first surface of said wood framing being bonded to a small portion of said second surface of said interior paneling thereby leaving a large remaining surface area of said second surface of said interior paneling spaced away from said wood framing;
   an insulating first substance abutted against said traverse surface of said wood framing and said second surface of said interior paneling;
   an exterior paneling having a finished planar first surface, an opposite thereto planar second surface and a thickness therebetween;
   a pliable first substrate having a pliant planar first surface, an opposite thereto pliant planar second surface and a thickness therebetween, said first surface of said first substrate being bonded to said second surface of said exterior paneling;
   metal framing having a planar first surface, an opposite thereto planar second surface and a thickness therebetween, said first surface of said metal framing being bonded to a small portion of said second surface of said first substrate thereby leaving a large remaining surface area of said second surface of said first substrate spaced away from said metal framing;
   a pliable second substrate having a pliant planar first surface, an opposite thereto pliant planar second surface and a thickness therebetween, said second surface of said metal framing being bonded to a small portion of said first surface of said second substrate thereby leaving a large remaining surface area of said first surface of said second substrate spaced away from said metal framing, said large remaining surface area of said first surface of said second substrate opposing said large remaining surface area of said second surface of said first substrate thereby forming a first space bounded by said second surface of said first substrate, said first surface of said second substrate and said metal framing;
   an insulating second substance enclosed in and approximately filling said first space;
   said second surface of said wood framing being fastened to a small portion of said second surface of said second substrate thereby leaving a large remaining surface area of said second surface of said second substrate spaced away from said wood framing, thereby forming a second space bounded by said large remaining surface area of said second surface of said second substrate, said large remaining surface area of said second surface of said interior paneling and said wood framing, and
   wherein said insulating first substance is enclosed in and approximately fills said second space.

2. The composite structure of claim 1, wherein said second substance is a rigid insulating panel having a planar first surface, an opposite thereto planar second surface and a thickness therebetween which is approximately equal to the thickness of said metal framing.

3. The composite structure of claim 1, wherein said first substance is a spun fiberglass insulation.

4. The composite structure of claim 1, wherein said metal framing is aluminum framing, wherein said interior paneling is interior wood paneling and said exterior paneling is selected from the group consisting of exterior plastic sheeting and exterior metal sheeting.

5. A composite structure for mobile carriages comprising:
   an interior paneling having a finished planar first surface, an opposite thereto planar second surface and a thickness therebetween;
   wood framing having a planar first surface, an opposite thereto planar second surface and a thickness and a traverse surface therebetween, said first surface of said wood framing being bonded to a small portion of said second surface of said interior paneling thereby leaving a large remaining surface area of said second surface of said interior paneling spaced away from said wood framing;
   an insulating first substance abutted against said traverse surface of said wood framing and said second surface of said interior paneling;
   an exterior paneling having a finished planar first surface, an opposite thereto planar second surface and a thickness therebetween;
   a pliable first substrate having a pliant planar first surface, an opposite thereto pliant planar second surface and a thickness therebetween, said first surface of said first substrate being bonded to said second surface of said exterior paneling;
   aluminum framing having a planar first surface, an opposite thereto planar second surface and a thickness and traverse surface therebetween, said first surface of said aluminum framing being bonded to a small portion of said second surface of said first substrate thereby leaving a large remaining surface area of said second surface of said first substrate spaced away from said aluminum framing;
   a pliable second substrate having a pliant planar first surface, an opposite thereto pliant planar second surface and a thickness therebetween, said second surface of said aluminum framing being bonded to a small portion of said first surface of said second substrate thereby leaving a large remaining surface area of said first surface of said second substrate spaced away from said aluminum framing, said large remaining surface area of said first surface of said second substrate opposing said large remaining surface area of said second surface of said first substrate thereby forming a first space bounded by said second surface of said first substrate, said first surface of said second substrate and said aluminum framing;

a rigid insulating second substance having a planar first surface, an opposite thereto planar second surface and a thickness therebetween which is approximately equal to said thickness of said aluminum framing, said first surface of said second substance being bonded to said large remaining surface area of said second surface of said first substrate, said second surface of said second substance being bonded to said large remaining surface area of said first surface of said second substrate, said second substance enclosed in and approximately filling said first space;

said second surface of said wood framing being fastened to a small portion of said second surface of said second substrate thereby leaving a large remaining surface area of said second surface of said second substrate spaced away from said wood framing, thereby forming a second space bounded by said large remaining surface area of said second surface of said second substrate, said large remaining surface area of said second surface of said interior paneling and said wood framing, and wherein said insulating first substance is enclosed in and approximately fills said second space.

6. The composite wall structure of claim 5, wherein said second substance is an expanded rigid polystyrene plastic.

7. The composite wall structure of claim 5, wherein said bond of said interior paneling to said wood framing is an adhesive bond and a stapled bond.

8. The composite wall structure of claim 5, wherein said bond of said first substrate to said exterior paneling is an adhesive bond; and wherein said bond of said aluminum framing to said first substrate and to said second substrate is an adhesive bond.

9. The composite structure of claim 8, wherein said adhesive bonds are vacuum adhesive bonds.

10. The composite structure of claim 5, further comprising a bond between said insulating second substance and said traverse surface of said aluminum framing.

11. The composite wall structure of claim 5, further comprising a first subassembly comprising said interior paneling, said wood framing and said first substance; a second subassembly comprising said exterior paneling, said first substrate, said aluminum framing, said second substance, and said second substrate, and wherein said fastening of said second surface of said wood framing to said second surface of said second substrate is by a plurality of metal fasteners extending from said aluminum framing through said second substrate and into said wood framing.

12. A method of forming composite wall structures for mobile carriages comprising:

(a) fastening interior paneling on wood framing, said interior paneling having a finished planar first surface, an opposite thereto planar second surface and a thickness therebetween, said wood framing having a planar first surface, an opposite thereto planar second surface and a thickness and a traverse surface therebetween, said fastening being by adhesively bonding and stapling said interior paneling to said wood framing so that a small portion of said second surface of said interior paneling is joined to said first surface of said wood framing, thereby leaving a large remaining surface area of said second surface of said interior paneling spaced away from said wood framing;

(b) abutting an insulating first substance against said traverse surface of said wood framing and said second surface of said interior paneling, thereby forming a first subassembly comprising said interior paneling, said wood framing and said first substance;

(c) fastening an exterior paneling to a pliable first substrate, said exterior paneling having a finished planar first surface, an opposite thereto planar second surface and a thickness therebetween, said first substrate having a pliant planar first surface, an opposite thereto pliant planar second surface and a thickness therebetween, said fastening being by adhesively bonding said first surface of said first substrate to said second surface of said exterior paneling;

(d) fastening metal framing to said first substrate, said metal framing having a planar first surface, an opposite thereto planar second surface and a thickness and a traverse surface therebetween, said fastening being by adhesively bonding said first surface of said metal framing to a small portion of said second surface of said first substrate thereby leaving a large remaining surface area of said second surface of said first substrate spaced away from said metal framing;

(e) abutting an insulating second substance to said large remaining surface area of said second surface of said first substrate, said second substance having a thickness which is approximately equal to the thickness of said metal framing;

(f) fastening a pliable second substrate to said metal framing, said pliable second substance having a pliant planar first surface, an opposite thereto pliant planar second surface and a thickness therebetween, said fastening being by adhesively bonding said second surface of said metal framing to a small portion of said first surface of said second substrate thereby leaving a large remaining surface area of said first surface of said second substrate spaced away from said metal framing, said large remaining surface area of said first surface of said second substrate opposing said large remaining surface area of said second surface of said first substrate, and thereby enclosing said second substance in a first space bounded by said second surface of said first substrate, said first surface of said second substrate and said metal framing, and thereby forming a second subassembly comprising said exterior paneling, said first substrate, said metal framing, said second substance and said second substrate; and (g) fastening said second subassembly to said first assembly by passing a plurality of metal fasteners through said metal framing into said wood framing with said second substrate sandwiched between said wood framing and said metal framing so that said second surface of said wood framing abuts a small portion of said second surface of said second substrate thereby leaving a large remaining surface area of said second surface of said second substrate spaced away from said wood framing, and thereby enclosing said first substance in a second space bounded by said large remaining surface area of said second surface of said second substrate, said large remaining surface area of said second surface of said interior paneling and said wood framing.

13. The method of claim 12, wherein said metal framing is aluminum framing, wherein said interior paneling is wood paneling, and wherein said exterior paneling is selected from the group consisting of plastic sheeting and metal sheeting.

14. The method of claim 12, further comprising making said first subassembly on a jig so that a plurality of substantially identical first subassemblies can be mass produced.

15. The method of claim 12, further comprising installing electrical wiring in said first assembly before fastening said second subassembly to said first subassembly.

16. The method of claim 12, further comprising fastening said first subassembly to a floor for a mobile carriage by metal fasteners going through said wood framing into said floor, and fastening said first subassembly to interior walls and interior cabinets by metal fasteners going through said wood framing and into said interior walls and said interior cabinets before fastening said second subassembly to said first subassembly.

17. The method of claim 12, wherein said insulating second substance is a rigid substance having a planar first surface, an opposite thereto planar second surface and said thickness thereof is between said first and second surfaces thereof; and further comprising adhesively bonding said first surface of said second substance to said large remaining surface area of said second surface of said first substrate; and adhesively bonding said second surface of said second substance to said large remaining surface area of said first surface of said second substrate so that said second substance fills said first space.

18. The method of claim 12, wherein said adhesively bonding of said exterior paneling to said first substrate, said adhesively bonding of said first substrate to said metal framing and said second substance, and said adhesively bonding of said metal framing and said second substance to said second substrate is completed simultaneously in a single vacuum bonding operation.

19. The method of claim 12, wherein said metal framing is aluminum framing, wherein said second substance comprises an expanded rigid polystyrene plastic, wherein said first substance is spun fiberglass, and wherein said metal fasteners are selected from the group consisting of screws, staples, nails and mixtures thereof.

20. The method of claim 19, wherein said fastening of said second subassembly to said first subassembly comprises screwing screws through said exterior paneling into said first substrate, thence into said aluminum framing, thence into said second substrate and thence into said wood framing.

21. The method of claim 20, wherein said fastening of said second subassembly to said first subassembly further comprises screwing screws through said exterior paneling into said first substrate, thence into said expanded rigid polystyrene plastic, thence into said second substrate and thence into said wood framing.

* * * * *